(No Model.)
A. CAMPBELL.
PLOW SHIELD.
No. 489,145.  Patented Jan. 3, 1893.
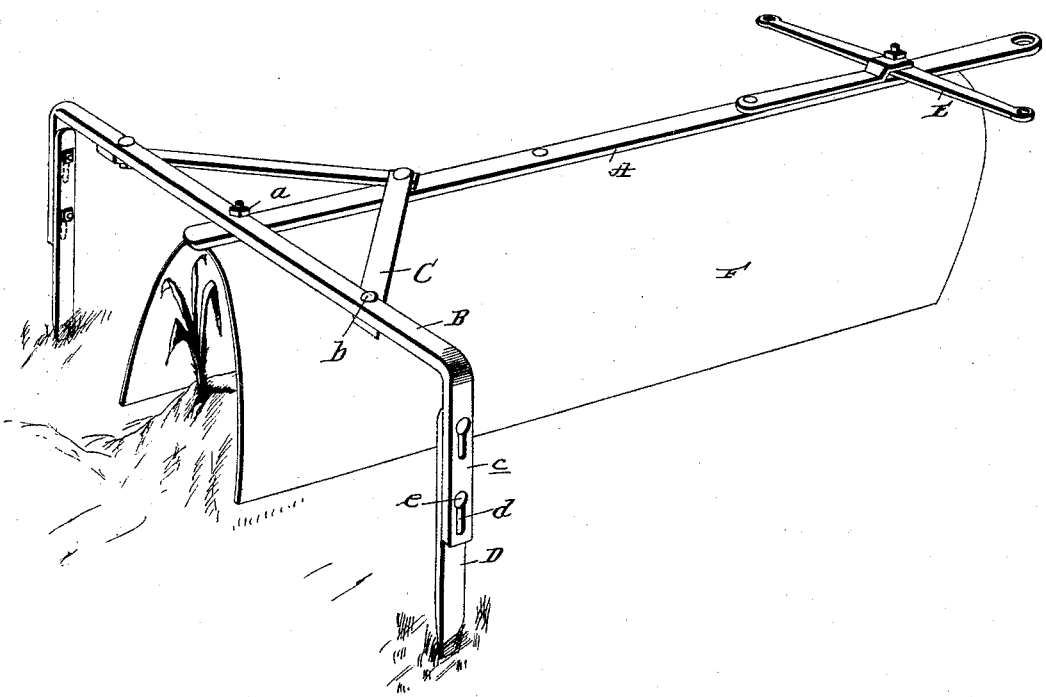
Witnesses:
Inventor
Alexander Campbell
By James Sheehy
Attorney

UNITED STATES PATENT OFFICE.

ALEXANDER CAMPBELL, OF GRISWOLD, IOWA.

PLOW-SHIELD.

SPECIFICATION forming part of Letters Patent No. 489,145, dated January 3, 1893.

Application filed April 6, 1892. Serial No. 428,044. (No model.)

*To all whom it may concern:*

Be it known that I, ALEXANDER CAMPBELL, a citizen of the United States, residing at Griswold, in the county of Pottawattamie and State of Iowa, have invented certain new and useful Improvements in Plow-Shields; and I do declare the following to be a full, clear, and exact description of the invention, such as will enable others skilled in the art to which it appertains to make and use the same.

This invention relates to an improvement in devices to attach to a cultivator or plow, and it has for its objects to provide a shield or guard for protecting the growing corn, cotton or any other plant while being cultivated; to adapt the guard or shield for adjustment whereby it may be raised or lowered at the will of the plowman or operator; to render the guard adjustable so that the plowed ground or earth may be thrown under the shield or guard toward the young plants without covering or injuring them; to render the device easy to operate in damp ground by lessening the liability of clogging and to steady the shield or guard so that it will not be liable to upset, or slide on a hill side.

Other objects and advantages will appear from the following description and claims when taken in connection with the annexed drawing, in which: The figure is a perspective view of my improved device.

Referring by letter to said drawing: A, indicates a central longitudinal bar which may be of metal or other suitable material, and B, indicates a cross bar secured about midway of its length to the rear end of the bar A, by means of a bolt *a*, or other suitable fastening device, and C, indicates brace arms which are connected at one end to the central longitudinal bar A, and at their opposite ends which extend obliquely in opposite directions to the cross bar, by a bolt *b*, or the like. The opposite ends of this cross bar B, terminate in rectangular depending branches *c*, which are provided with vertical elongated slots *d*, for a purpose which will be presently explained.

D, indicates the runner points or blades. These blades which are of a suitable length and width, are adjustably secured to the depending branches *c*, of the cross bar by means of bolts *e*, or other suitable fastening devices. The bolts passing through the slots *d*, so that the blades may be secured adjustably to the depending branches, and the device raised to any suitable altitude according to the height of the growing plants as will presently appear. The opposite or forward end of this central longitudinal bar is provided with a whiffletree E, for the attachment of draft animals although it is obvious that the draft may be applied by any suitable means.

F, indicates the shield or plant protector. This shield which may be formed from sheet metal or other suitable material—is of a suitable length as shown, and of arch shape in cross section. This shield is secured at its longitudinal center to the under side of the bar A, so as to depend therefrom in an arched manner, and is designed to hood or protect the corn, and its lower longitudinal edges in operation will assume a height sufficient from the ground to allow the plowed earth to be thrown under its edges but such shield will protect the growing corn from being covered by the earth.

In operation the device is driven along a field attached to a plow so that the shield will arch the growing corn when the runners points or blades being properly adjusted on the depending branches of the cross bar, will raise the shield sufficiently high so that it will not break or injure the plants.

With a device of this character, the growing plants may be cultivated from the time they come through the ground until what is termed the second plowing or cultivating is finished.

Having described my invention what I claim is:

1. A device for shielding and protecting corn, comprising the central longitudinal bar, the cross bar secured to the rear end thereof, and having the slotted depending branches at opposite ends, the blades or runners adapted to be secured adjustably to said slotted branches, and the arched shield secured to the center longitudinal bar, said frame being adapted for attachment to cultivators or draft animals, substantially as specified.

2. A plant protector comprising an arched shield formed from a continuous piece of material and adapted to straddle growing plants, and secured to a suitable frame, having depending slotted branches and legs or runners adapted to be adjustably secured to said depending branches the frame on opposite sides of the shield, substantially as specified.

In testimony whereof I affix my signature in presence of two witnesses.

ALEXANDER CAMPBELL.

Witnesses:
W. C. BRYANT,
J. C. CONNOR.